(12) United States Patent
Nishimura et al.

(10) Patent No.: US 7,800,814 B2
(45) Date of Patent: Sep. 21, 2010

(54) STRUCTURAL COLOR DISPLAY

(75) Inventors: Motoi Nishimura, Tokyo (JP);
Mitsutoshi Nakamura, Tokyo (JP);
Tatsuya Nagase, Tokyo (JP); Aya Shirai, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 116 days.

(21) Appl. No.: 12/329,361

(22) Filed: Dec. 5, 2008

(65) Prior Publication Data

US 2009/0147347 A1 Jun. 11, 2009

(30) Foreign Application Priority Data

Dec. 10, 2007 (JP) .............................. 2007-318086

(51) Int. Cl.
*G02B 26/00* (2006.01)
*G09G 3/34* (2006.01)

(52) U.S. Cl. ....................... 359/296; 345/107

(58) Field of Classification Search ................. 359/296; 345/107; 430/32; 204/600
See application file for complete search history.

(56) References Cited

U.S. PATENT DOCUMENTS 7,538,933 B2 * 5/2009 Nakayama et al. .......... 359/296

| | | |
|---|---|---|
| 2004/0227874 A1 | 11/2004 | Kim et al. |
| 2005/0094248 A1 | 5/2005 | Katase |

FOREIGN PATENT DOCUMENTS

| | | |
|---|---|---|
| EP | 1785768 | 5/2007 |
| JP | 2007156444 | 6/2007 |
| WO | 2006108285 | 10/2006 |

* cited by examiner

*Primary Examiner*—William C Choi
(74) *Attorney, Agent, or Firm*—Lucas & Mercanti, LLP

(57) ABSTRACT

Disclosed is a structural color display including: (a) a pattern forming member which forms a plurality of cells each lined up in two dimension; and (b) a light transmissive image display sheet comprising a color showing layer which shows a structural color, the light transmissive image display sheet being laminated on the pattern forming member, wherein each of the cells is independently controlled to switch to a light reflective state or to a light absorptive state corresponding to an image pattern to be displayed, provided that the light absorptive state is a state in which a light which enters in the cell through the image display sheet is absorbed; and the light reflective state is a state in which a light which enters in the cell through the image display sheet is reflected and the reflected light is made to enter in a region of the image display sheet corresponding to the cell.

13 Claims, 2 Drawing Sheets

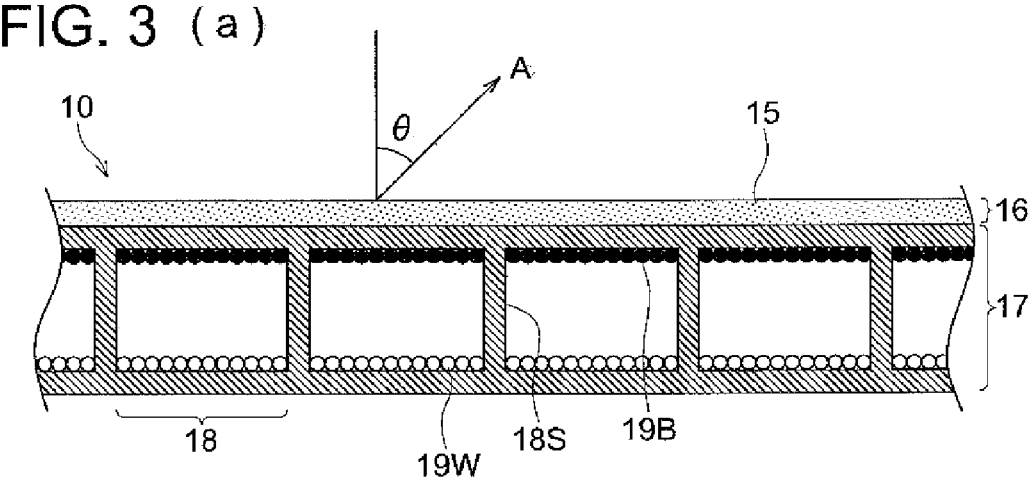
FIG. 3 (a)
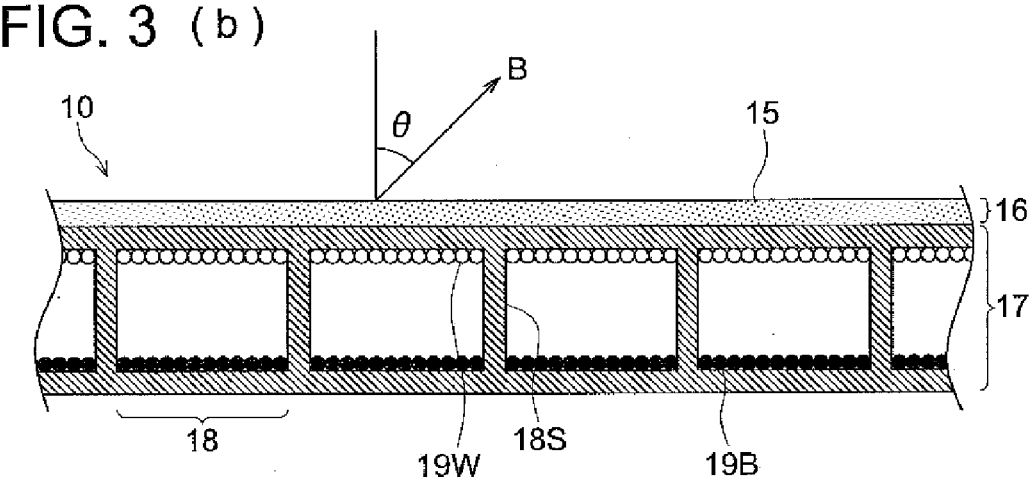
FIG. 3 (b)
FIG. 4
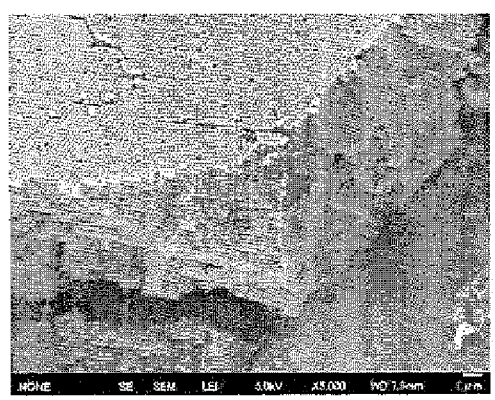

STRUCTURAL COLOR DISPLAY

CROSS-REFERENCE TO RELATED APPLICATION

This application is based on Japanese Patent Application No. 2007318086 filed on Dec. 10, 2007 with Japan Patent Office, the entire content of which is hereby incorporated by reference.

BACKGROUND OF THE INVENTION

1. Technical Field

The present invention relates to a structural color display utilizing color showing of a structural color.

2. Description of Related Art

Heretofore, a display which provides sufficient brightness at low electrical power consumption has been demanded. More recently, a display exhibiting high anisotropy has been desired from a security point of view so that only the user thereof is able to view it.

However, a general liquid crystal display requires large power consumption (for example, 50 to 100 W), and electronic paper which features color display as disclosed in Patent Document 1 exhibits problems such that the image surface of the electronic paper tends to darken since a color filter is employed, and further, the image surface thereof becomes darker when filters such as a polarizing filter is employed to improve visual security.

Patent Document 1: Japanese Patent Application Publication No. 2007-156444

SUMMARY

The present invention is achieved in consideration of the above problems, and it is an object of the present invention to provide a color display exhibiting sufficient brightness at low electric power consumption (around a few W), and high visual security.

The structural color display of the present invention displays an image based on the structural color, and is characterized in that the light transmissive image display sheet featuring a color showing layer which shows the structural color is overlaid on the pattern image forming member which is constituted such that a plurality of cells are arranged side by side across the surface, in which each cell is controlled to be switched between a light reflective state and a light absorptive state, and each aforesaid cell, corresponding to image patterns to be displayed, enters a light absorptive state where light transmitted through the image display sheet is absorbed, or a light reflective state where light transmitted through the image display sheet is reflected into an area of the above-mentioned image display sheet corresponding to the aforesaid cell.

In the structural color display of the present invention, the above-mentioned pattern image forming member can be an electronic paper of a black and white display.

According to the structural color display of the present invention, since the structural color, which differs from a color generated by typical dye absorption, exhibits small energy loss, as well as exhibiting high brightness, the structural color display provides sufficient brightness at low electrical power consumption, and further, can exhibit high visual security on a displayed image, since the structural color depends on viewing angle.

BRIEF DESCRIPTION OF THE DRAWINGS

FIG. 3: An explanatory figure of a visually recognized color in the structural color of the present invention; FIG. 3(a) shows the cell being in the light absorptive state, and FIG. 3(b) shows the cell being in the light reflective state.

FIG. 4: A SEM photograph of the image display sheet prepared as an example.

DESCRIPTION OF THE PREFERRED EMBODIMENT

The present invention is explained in detail below.

The structural color is not a color generated by a light absorption by dyes and the likes but a reflection color of selected light generated by a periodic structure and the like. The structural color can be generated by, for example, thin film interference, light scattering (such as Rayleigh scattering and the Mie scattering), multilayer interference, a diffraction grating, and a photonic crystal.

Figure 1:
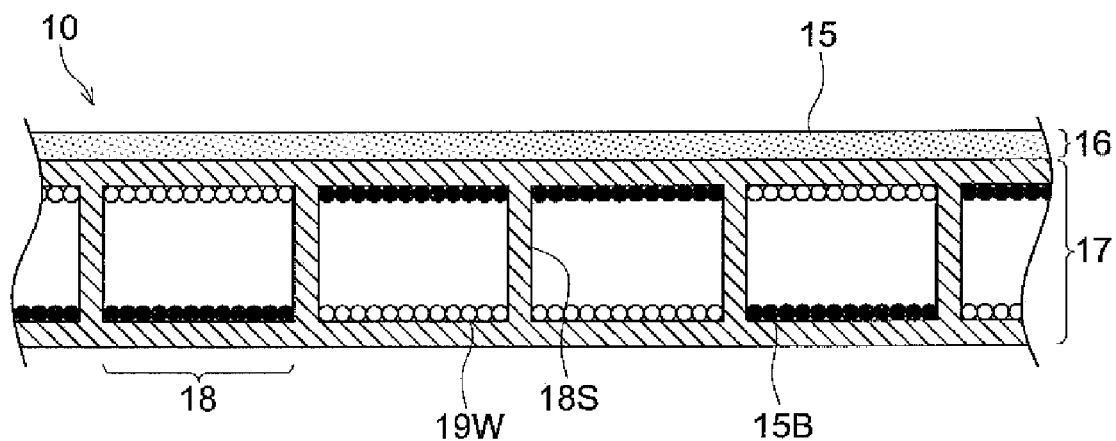
FIG. 1: An explanatory cross-sectional view illustrating an example of a constitution of the structural color display of the present invention.
Figure 2:
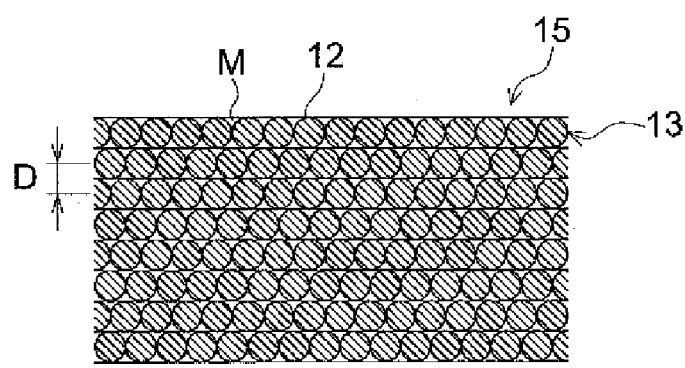
FIG. 2: An explanatory cross-sectional view illustrating an example of a constitution of a color showing layer constituting the structural color display of the present invention.

FIG. 1 is an explanatory cross-sectional view illustrating an example of a constitution of the structural color display of the present invention. FIG. 2 is an explanatory cross-sectional view illustrating an example of a constitution of a color showing layer constituting the structural color display of the present invention.

The structural color display 10 of the present invention is constituted such that, as shown in FIG. 1, the light transmissive image display sheet 16, having the color showing layer 15 which shows the structural color, is overlaid on the pattern image forming member 17, which is constituted such that the cells 18 is arranged side by side across the surface, in which each cell 18 is controlled to be switched between a light reflective state and a light absorptive state, and the aforesaid each cell 18, corresponding to image patterns to be displayed, becomes a light absorptive state where light transmitted through the image display sheet 16 is absorbed, or a light reflective state where the light transmitted through the image display sheet 16 is reflected into an area of the above-mentioned image display sheet 16 corresponding to the aforesaid cell 18, and then a pattern image is formed, and as a result, the above pattern image is visually recognized on the surface of the image display forming sheet 16 as an image based on the structural color.

The pattern image forming member 17 includes, as is described later, for example, an electronic paper of a black and white display. In the descriptions below, the electronic paper of a black and white display is used constituting the pattern image forming member 17.

[Color Showing Layer]

The color showing layer 15 of the image display sheet 16 constituting the structural color display 10 is a layer which shows the structural color, and which color showing layer 15 is specifically constituted such that, as shown in FIG. 2, in a matrix M such as, for example the atmosphere, a plurality of the particle layers 13 composed of the particles 12 for color showing layer exhibiting a refractive index differing from a refractive index of the above matrix M, are regularly arranged in the thickness direction to form a repeating structure. Based on the formation of such a repeating structure in the color showing layer 15, chromatic colors can be visually recognized by irradiating visible range light.

In such a color showing layer 15, the particles 12 for color showing layer are close-packed so as to form a cubic close-packed structure such as a face-centered cubic structure or a hexagonal close-packed structure to form the color showing layer 15.

The difference of the refractive index between the particle 12 for color showing layer and the matrix M can be suitably set depending on properties of the targeted structural color display or kinds of the pattern image forming member. The above difference can be set, for example, to 0.1 to 0.7, and more preferably 0.2 to 0.5.

The refractive index of particles can be determined by various commonly known methods, but the refractive index of the particles 12 for color showing layer of the present invention is a value measured by a water immersion method.

Specific refractive indices of particles include, for example, 1.59 for polystyrene, 1.49 for methyl polymethacrylate, 1.60 for polyester, 1.40 for fluorine modified methyl polymethacrylate, 1.56 for polystyrene/butadiene copolymer, 1.48 for methyl polyacrylate, 1.47 for butyl polyacrylate, 1.45 for silica, 2.52 for titanium oxide (anatase type), 2.76 for titanium oxide (a rutile type), 2.71 for copper oxide, 1.76 for aluminum oxide, 1.64 for barium sulfate, and 3.08 for ferric oxide.

[Structural Color]

The structural color is a color represented by Formula (1) below based on Bragg's Law.

$$\lambda = 2nD(\cos\theta) \quad \text{Formula (1)}$$

In Formula (1), $\lambda$ represents a peak wavelength of the structural color, n represents a refractive index of the color image showing layer 15 represented by Formula (2) below, D represents a distance between the particle layers 13, and $\theta$ represents a viewing angle to a perpendicular line on the image display sheet 16.

$$n = \{na \cdot C\} + \{nb \cdot (1-c)\} \quad \text{Formula (2)}$$

In Formula (2), na represents a refractive index of the Particle 12 for color showing layer, nb represents a refractive index of the matrix M, and c represents a volume fraction of the particle 12 for color showing layer in the color showing layer 15.

In a case where, as shown in FIG. 3(*a*), the cell 18 in the pattern image forming member 17 is in a light absorptive state, the color A having a peak wavelength calculated by above Formula (1) is visually recognized, while, in a case where, as shown in FIG. 3(*b*), the cell 18 in the pattern image forming member 17 is in a light reflective state, the complementary color B of the color A having a peak wavelength calculated by above Formula (1) is visually recognized.

It is preferable that the particle 12 for color showing layer, which forms the color showing layer 15, exhibits a spherical shape. The "exhibiting a spherical shape" means that SEM photographs of randomly selected 100 particles for color showing layer are taken at a magnification of 10,000 times employing a scan electron microscope (SEM), which photographs are then analyzed via an image processing analyzer (manufactured by Nireco Corp.), and an average SF-1 value derived from Numerical Formula (1) below is from 100 to 110.

$$\text{SF-1 value} = (\text{the maximum length of a particle})^2/(\text{a projected area of a particle}) \times (\pi/4) \times 100 \quad \text{Numerical Formula (1)}$$

In above Numerical Formula (1), the "maximum length of a particle" refers to the maximum width of a projected image of the particle on a plane, which maximum width is the maximum distance of distances of parallel two lines which sandwich the projected image, and the "a projected area of a particle" refers to an area of a projected image on a plane of the particle for color showing layer.

The average particle diameter of the particle 12 for color showing layer can be, for example, from 100 to 300 nm, and preferably from 150 to 250 nm.

Since the structural color of the obtainable structural color display 10, which is visually recognized at a certain viewing angle, is determined by the average particle diameter of the particle 12 for color showing layer, the aforesaid particle diameter may be suitably set so that a color required for the structural color which is visually recognized at a certain viewing angle is shown.

Further, when the color showing layer 15 is formed, the particle 12 for color showing layer preferably exhibits high monodispersity to readily achieve a regular arrangement of the particle 12 for color showing layer, and the CV value indicating a particle distribution is preferably 20% or less, more preferably 10 or less, and particularly preferably 5% or less.

When the CV value is less than 20%, the color showing layer composed of an regularly arrangement of the particle 12 for color showing layer can be formed in matrix M, and as a result, the color showing layer, which shows the structural color, can be provided.

The term "average particle diameter" refers to a number-based average diameter, and the term "CV value" refers to a number-based particle distribution. Specifically, the average particle diameter and the CV value are determined by the method below.

The average particle diameter is obtained in a manner that photographs of 200 particles are taken at a magnification of 50,000 times employing a scan electron microscope "JSM-7410" (manufactured by JEOL Ltd.), and the maximum length of each of spherical particles on the photographs is measured, and then the number-based average value is calculated. The term "the maximum length" refers to the maximum length of lengths between any two points on circumference of each spherical particle.

The CV value is calculated by Formula (CV) below employing the standard deviation of the number-based particle distribution and the above average particle diameter.

$$CV \text{ value } (\%) = ((\text{standard deviation})/(\text{average particle diameter})) \times 100 \quad \text{Formula (CV)}$$

The thickness of the Color showing layer 15 is preferably, for example, from 3 to 30 μm.

When the thickness of the color showing layer is 3 μm or more, color showing of the aforesaid color showing layer is superior, and then the brightness of the obtainable structural color display may be sufficient, and when the thickness of the color showing layer is less than 30 μm, the obtainable image display sheet becomes clear to have less light scattering, and as a result, color showing of the image display sheet is superior, and then the brightness of the obtainable structural color display may be sufficient.

In the color showing layer 15, the repeating number of the particle layer 13 is preferably 8 or more, and more preferably from 8 to 50.

In a case where the repeating number is less than 8, the color showing layer is not allowed to show the structural color.

[Particle for Color Showing Layer]

The particle 12 for color showing layer, which forms the color showing layer 15, includes various compositions.

Specific examples of the organic particle include polymerized particles comprising a polymerizable monomer, and copolymerized particles comprising two or more kinds of polymerizable monomers, which monomer includes a styrene monomer such as styrene, methyl styrene, methoxy styrene, butyl styrene, phenyl styrene, and chlorostyrene; an acrylic acid ester monomer or a methacrylic acid ester monomer such as methyl acrylate, ethyl acrylate, (iso)propyl acrylate, butyl acrylate, hexyl acrylate, octyl acrylate, ethylhexyl acrylate, methyl methacrylate, ethyl methacrylate, butyl methacrylate, and ethylhexyl methacrylate; a carboxylic acid monomer such as acrylic acid, methacrylic acid, itaconic acid, and fumaric acid.

Further, the above particle may include a polymerized particle comprising a polymerizable monomer in which a crosslinkable monomer is added. The crosslinkable monomers include divinylbenzene, ethylene glycol dimethacrylate, tetraethylene glycol dimethacrylate, and trimethylol propane trimethacrylate.

Still further, for example, inorganic particles include inorganic oxide such as silica, titanium oxide, alumina, and copper oxide, and composite oxide; and particles formed from glass, or ceramic.

The particle 12 for color showing layer constituting the color showing layer 15 may be an element comprising a single composition, or may be a compound. Further, the aforesaid particle may be a particle on which surface a substance, by which particles are allowed to adhere to each other, is adhered, or may be a particle within which a substance, by which particles are allowed to adhere to each other, is introduced. By employing such an adhesive, particles are allowed to adhere to each other, even if the particles are composed of materials which tend not to self-arrange during formation of the color showing layer. Further, in a case where the particles are formed employing materials exhibiting a high refractive index, a material exhibiting a low refractive index may be added internally.

To obtain particles exhibiting high monodispersity, in a case where particles for color showing layer are composed of organic materials, the aforesaid particles for color showing layer are preferably prepared via generally commonly used polymerization methods such as soap-free emulsion polymerization, suspension polymerization, and emulsion polymerization.

Further, the particles 12 for color showing layer may be subjected to various surface treatments to make the particles exhibit a high affinity to matrix M, control the refractive index of the particles 12 for color showing layer, or readily allow for regular arrangement of the particles.

Such color showing layer 15 can be formed via a method, for example, in which an aqueous dispersion of the particles 12 for color showing layer is prepared, and the dispersion is applied on a surface of the pattern image forming member 17 or a light transmissive substrate to allow particles to be self-arranged.

The coating methods such as a screen coating, a dip coating, a spin coating, a curtain coating, and a LB (Langmuir-Blodgett) film forming method can be employed.

[Matrix]

A material for matrix M which forms color showing layer 15 is not particularly limited, and can be suitably selected as long as the material exhibits a different refractive index from a material constituting the particles 12 for color showing layer, as well as the material can fix the aforesaid particles 12 for color showing layer.

The matrix M constituting the color showing layer 15 may be a substance in the form of gas or liquid, but a substance in the form of solid or gel is preferably employed since the prepared display medium exhibits a high strength, excellent particle-detachment restraining properties, and excellent flexibility.

The materials which form the matrix M constituting the color showing layer 15 can be suitably selected from materials whose refractive indices differ from that of the particle 12 for color showing layer, and are incompatible with materials composing the particle 12 for color showing layer.

Further, the materials which form the matrix M preferably have a high affinity to the particles.

Examples of the material which forms the matrix M include an organic solvent-soluble resin, a water-soluble resin, hydrogel, oilgel, a light curing agent, a heat curing agent, and a moisture curing agent.

Specific organic solvent-soluble resins include a polystyrene resin, an acryl resin, and a polyester resin. Water-soluble resins include a polyacrylic acid, a polyvinyl alcohol, and a polyvinyl chloride.

Specific hydrogels include a gel which is prepared by blending water and a gelling agent such as a gelatin, a carrageenan, a polyacrylic acid, and a sodium polyacrylate. Oil gels include a silicone gel, a fluorine silicone gel, and a gel which is prepared by blending a gelling agent such as aminoacid derivatives, cyclohexane derivatives, and polycyclohexane derivatives, with silicone oil or an organic solvent.

The refractive index of the matrix M can be determined by various commonly known methods, but the refractive index of the matrix M of the present invention is determined such that a thin film comprising only the matrix M is separately prepared and the thin film is measured using an Abbe Refractometer.

Specific refractive indices include, for example, 1.53 for gelatin/acacia gum, 1.51 for polyvinyl alcohol, 1.51 for sodium polyacrylate, 1.34 for fluorine modified acrylic resin, 1.51 for N-isopropyl amid, and 1.43 for foamed acrylic resin.

[Image Display Sheet]

The image display sheet 16 constituting the structural color display 10 of the present invention is a light transmissive substance and has the above-mentioned color showing layer 15.

By the term "light transmissive substance", it is meant that the substance can transmit visible light, and specifically, the substance is not an opaque substance which does not transmit visible light. The term "opaque substance" means a substance in which the display color of the structural color display does not change, even when the pattern image forming member is changed between a light absorptive state and a light reflective state with visible light being irradiated onto the structure display.

Meeting the needs of usage or production methods, a substrate or a surface coverage layer can be provided on the image display sheet 16 constituting the structural color display 10 of the present invention. An example of the constitution can be made by laminating a light transmissive substrate, the color showing layer 15 which is formed on the surface of the aforesaid light transmissive substrate, and a surface coverage layer which is provided on the aforesaid color showing layer 15 through a light transmissive adhesive layer, in this order.

The usable light transmissive substrate includes glass, and a film or a sheet of materials such as polyethylene terephthalate (PET) and polyethylene naphthalate (PEN).

In a case where the color showing layer 15 is produced by employing an aqueous dispersion of the particles 12 for color showing layer, the light transmissive substrate is preferably subjected to a suitable surface treatment, since the light transmissive substrate preferably exhibits a relatively low contact angle on the surface against water, and a high surface smoothness. Further, the light transmissive substrate may be subjected to a blast finishing treatment so that the particles for color showing layer readily adhere onto the surface of the above finishing treatment substrate.

In a case where the surface coverage layer is provided, usable materials for the aforesaid surface coverage layer include a film comprising materials such as polyethylene terephthalate (PET) and polyethylene naphthalate (PEN), and a film comprising a UV curable resin, all of which exhibit high transparency and do not prevent the structural color showing in the color showing layer 15.

[Pattern Image Forming Member]

The pattern image forming member 17 is constituted such that the cells 18 are arranged side by side across the surface, and each cell 18 can be optionally switched between (1) a light absorptive state; in which, corresponding to image patterns to be displayed, the pattern image forming member 17 absorbs light transmitted through the image display sheet 16, and (2) a light reflective state; in which the pattern image forming member 17 reflects the light transmitted through the image display sheet 16 into an area of the above-mentioned image display sheet 16 corresponding to the aforesaid cell 18.

As the pattern image forming member 17, for example, a sheet-shaped member is preferred.

The light reflective state and the light absorptive state of the cell 18 are defined by a magnitude of the light reflectance, and in a case where the aforesaid light reflectance is from 0 to less than 50%, more preferably from 1 to 20%, the state is preferably referred to as the light absorptive state, and in a case where the aforesaid light reflectance is from 50 to 100%, more preferably from 80 to 100%, the state is preferably referred to as the light reflective state.

The term "light reflectance" refers to a value calculated by a ratio of an intensity of reflected light $I_0$ to an intensity of incident light I, that is, $(I_0/I) \times 100$. Specifically, the light reflectance is calculated by Mathematical Formula (2): density=$\log_{10}(I/I_0)$, wherein the density is determined employing a reflection densitometer "RD-918" (made by Macbeth Co.).

The cell 18 is preferably constituted such that the light reflective state is composed of a white display where the light reflectance is the highest, and a black display state where the light reflectance is the lowest. Such pattern image forming member 17 includes, for example, an electronic paper of a black and white display as shown in FIG. 1 and FIG. 3.

The pattern image forming member 17, which is composed of the above electronic paper of a black and white display, is constituted such that a plurality of the cells 18 being insulated each other, which alternatively displays white or black according to an electric field and works as one pixel, are arranged side-by-side in a lattice pattern across the surface. And on the upper and lower surfaces of each cell 18, an upper electrode and a lower electrode are provided as a so-called sandwich electrode. The dimensions of each cell 18 is designed to be, for example, from 20×20×20 μm to 2,000×2,000×200 μm in width×length×height.

In the cell 18, a white displaying state corresponds to the light reflective state, and a black displaying state corresponds to the light absorptive state.

Each cell 18 is composed such that two types of particles differing in color, which are a group of black particles comprising a black particle 19B and a group of white particles comprising a white particle 19W, are enclosed in each cell frame 18S, and the group of black particles and the group of white particles are electrified in reversed polarity to each other.

In the cell 18 for example, in a case where the electric field, which is generated by applying a voltage between the upper electrode and the lower electrode, is controlled to yield a white display state, the group of white particles is collected in a ceiling area of the cell 18 as shown in FIG. 3(a), and at the same time, a group of black particles is collected in a floor area of the aforesaid cell 18, to result in a light reflection state which reflects light. On the other hand, in a case where the electric field is controlled to display black, the group of black particles is collected in a ceiling area of the cell 18, and at the same time, a group of white particles is collected in a floor area of the aforesaid cell 18, to result in a light absorptive state which absorbs light.

The shape of the cell frame 18S constituting the above-described cell 18 may be, for example, cubic, and at least the ceiling wall of the cell is formed of a transparent substance.

The pattern image forming member 17, which are composed of such cells being regularly arranged side-by-side, can be formed in a manner that, for example, dividing walls are formed with a designated spacing between two transparent sheets facing each other, and then, in areas thus divided, the prescribed group of black particles and group of white particles are enclosed.

The white particle 19W and/or the black particle 19B, both of which are enclosed in the cell 18, may be composed of an organic particle or an inorganic particle. The organic particle can be prepared, for example, by kneading a resin, a charge controlling agent, a coloring agent, or the other additives, followed by pulverizing it.

As the resin, conventionally commonly known resin is usable, and the charge controlling agents include, in a case where the particles are positively-charged, quaternary ammonium salt compounds, negrosine dyes, triphenylmethane compounds, and imidazole derivatives, and in a case where the particles are negatively-charged, they include metal azo dyes, salicylic acid metal complexes, and niroimidazole derivatives.

As the coloring agents, conventionally commonly known various types of organic or inorganic pigments or dyes exhibiting each color are usable.

The average particle diameter of the white particle 19W and/or the black particle 19B is preferably from 2.5 to 20 μm in the volume-based median diameter $D_{50}$ measured by employing the COULTER MULTISIZER 3 (produced by Beckman Coulter Inc.), and the variation in diameter and shape of the particle is preferably small.

Examples of the specific particle include, as the white particle 19W, a particle of styrene acryl resin exhibiting the average particle diameter of 8 μm on which surface a silica is externally added, and as the black particle 19B, a resin particle comprising a particle of styrene acryl resin exhibiting the average particle diameter of 8 μm incorporating a carbon black as a coloring agent.

The structural color display 10 of the present invention can be formed by adhering the pattern image forming member 17 to the image display sheet 16 by means of, for example, a light transmissive adhesive.

In the above-described structural color display 10, corresponding to the image pattern to be displayed, the cell 18 corresponding to a light absorptive state (a black display) absorbs light transmitted through the image display sheet 16, and does not allow light to pass into a light absorbing area corresponding to the above cell 18 in the image display sheet 16, and consequently the light absorbing area becomes a state so that a structural color according to the Bragg's law is visually recognized. And at the same time, corresponding to the image pattern to be displayed, the cell 18 corresponding to a light reflective state (a white display) reflects light transmitted through the image display sheet 16, and allows light to pass from the back side into a light absorbing area corresponding to the cell 18 in the image display sheet 16, and consequently the light reflecting area becomes a state so that a complementary color of the structural color according to the Bragg's law is visually recognized. As a result, images are visually recognized with two structural colors on the surface of the image display sheet 16.

According to the above structural color display 10, since the structural color, which differs to a color based on typical dye absorption, exhibits less energy loss and higher brightness, the structural color provides sufficient brightness at low electric power consumption, and further, provides a high visible security regarding the displayed images, since the structural color depends on viewing angle.

In the foregoing embodiments, the present invention was specifically described, but is not limited to the above, and the embodiments can be variously modified.

EXAMPLES

The invention is described below with reference to examples, but the invention is not limited to them.

Example 1

For Preparation of Particle for Color Showing Layer 100 parts by mass of styrene was heated to 80° C. to prepare a mixed solution of a monomer. The surfactant solution [A], in which 0.4 parts by mass of sodium dodecyl sulfonate was dissolved into 263 parts by mass of distilled water, was heated to 80° C., which surfactant solution was then blended with the above mixed solution of a monomer. After that, the resulting mixture was subjected to a dispersion treatment for 30 minutes via a mechanical dispersion apparatus "CLEARMIX" (produced by M Technique Co., Ltd.) to prepare an emulsified dispersion.

Into a reaction vessel equipped with a mixer, a heating and cooling apparatus, a nitrogen charging apparatus, and a material and additive introducing apparatus, the surfactant solution [B], in which the above emulsified dispersion and 0.2 parts by mass of sodium dodecyl sulfonate were dissolved into 142 parts by mass of distilled water, was introduced, and the temperature of the solution was raised to 80° C. while stirring at a stirring rate of 200 rpm in a nitrogen gas stream atmosphere. Into the above solution, 1.4 parts by mass of potassium persulfate, and 54 parts by mass of water were introduced, and the resulting solution was subjected to polymerization treatment for 3 hours. After that, the materials produced by the above polymerization reaction were filtered off, sufficiently washed with distilled water, and then dried employing a vacuum dryer, to prepare the particle [1] for color showing layer comprising a highly monodispersed polystyrene exhibiting an average particle diameter of 200 nm, and a CV value of 5%. The determinations of the average particle diameter and the CV value were carried out in the methods similar to the above. In the examples below, the determinations were similarly carried out.

Examples 2 and 3

For Preparation of Particle for Color Showing Layer

The particles [2] and [3] for color showing layer comprising a highly monodispersed polystyrene were prepared in a similar manner to Example 1 for the preparation of particle for color showing layer except that the amount of the sodium dodecyl sulfonate for the preparation of the surfactant solution [A] of Example 1 was changed to 0.37 parts by mass and 0.34 parts by mass for the particles [2] and [3] respectively. The average particle diameter and the CV value for each of the particles [2] and [3] are given in Table 1.

Example 4

For Preparation of Particle for Color Showing Layer

The particle [4] for color showing layer comprising a highly monodispersed polymethyl methacrylate (PMMA) exhibiting an average particle diameter of 175 nm and a CV value of 5% was prepared in a similar manner to Example 1 for the preparation of particle for color showing layer except that the styrene of Example 1 was changed to methyl methacrylate.

Example 5

For Preparation of Particle for Color Showing Layer

The particle [5] for color showing layer comprising a highly monodispersed PMMA exhibiting an average particle diameter of 250 nm and a CV value of 5% was prepared in a similar manner to Example 4 for the preparation of particle for color showing layer except that the amount of the sodium dodecyl sulfonate for the preparation of the surfactant solution [A] of Example 4 of was changed to 0.3 parts by mass.

Example 1

For Preparation of Image Display Sheet

A suspension solution incorporating the particle [1] for color showing layer in an amount of 20% by mass was prepared, which was then applied onto a transparent PET film of 50 μm in thickness to 30 μm in thickness containing water, and then dried to prepare the display sheet comprising the coated film of 4 μm in thickness. On the surface of the above coated film, polyethylene terephthalate (PET) was applied as a protective layer, and the display layer was subjected to a fixing treatment by re-drying, to prepare the image display sheet [1].

The above image display sheet [1] was subjected to a SEM observation, and as a result it was confirmed that the particles were regularly arranged in a hexagonal close-packed structure. The SEM photograph taken by the above SEM observation is shown in FIG. 4.

Examples 2 to 5

For Preparation of Image Display Sheet

The image display sheets [2] to [5] were prepared in a similar manner to the preparation of the image display sheet

[1] except that the particle [1] for color showing layer was change to each of the particles [2] to [5] for color showing layer.

Example 1

For Preparation of Pattern Image Forming Member (1) Example for Preparation of White Particle 100 parts by mass of styrene acryl resin (at a weight-average molecular weight of 20,000) and 100 parts by mass of anatase-type titanium oxide (at a number-average primary particle diameter of 150 nm) were introduced into a HENSCHEL MIXER (manufactured by Mitsui Miike Machinery Co., Ltd.), and was subjected to a blending treatment over 5 minutes at a circumferential speed of the mixing blades being set to 25 m/second to produce a mixture. The above mixture was kneaded via a biaxial extrusion kneading machine, after which the kneaded mixture was pulverized via a turbo-mill pulverizer (manufactured by Turbo Kyogyo Co., Ltd.) after initially being coarsely pulverized via a hammer mill. After that, the resulting fine particles were subjected to classification treatment via an air classifying machine utilizing the Coanda effect, to prepare white particles exhibiting an average particle diameter of 8.2 µm in term of a volume-based median diameter.

Subsequently, the above white particles were treated with external additives in such a manner that to the above white particles, 0.6 parts by mass of fine silica particles (at a number-average primary particle diameter of 50 nm), which were treated with an aminosilane coupling agent, were added, which were then subjected to a blending treatment over 10 minutes with a hybridizer (manufactured by Nara Machinery Co., Ltd.) at rotating rate of 15,000 rpm, and further 1.0 part by mass of fine silica particles (at a number-average primary particle diameter of 15 nm), which were treated with an aminosilane coupling agent, were added, followed by a blending treatment similar to the above treatment, to prepare the white particle [W].

(2) Example for Preparation of Black Particle

Black particles exhibiting an average particle diameter of 8.2 µm in term of a volume-based median diameter were produced by treatments of blending, kneading, pulverizing, and fine particle classification in a similar manner to the example for the preparation of the white particles except that 100 parts by mass of anatase-type titanium oxide was changed to 10 parts by mass of carbon black (at a number-average primary particle diameter of 25 nm). After that the above black particles were treated with external additives in a similar manner to the example of the white particles, to prepare the black particle [B].

(3) Example for Preparation of Pattern Image Forming Member

Two glass substrates of 80 mm in length, 50 mm in width, and 0.7 mm in thickness were prepared, and a layered electrode composed of indium tin oxide (ITO) layer of 300 nm in thickness was formed via a vapor-deposition technique on each surface of the aforesaid substrate. And onto the aforesaid layered electrode, an application liquid, in which 12 grams of polycarbonate resin, at a viscosity average molecular weight of 30,000 and having Structure Formula (1) described below, was dissolved in a mixed solvent of 80 ml of tetrahydrofuran and 20 ml of toluene, was coated by a spin coat method to a dried film thickness of 3 µm, and then dried to form an insulating layer.

Each of white particle [W] and black particle [B] was stirred with a shaker for 30 minutes, to be positively and negatively charged respectively.

Then, dividing walls were formed so that cell areas of 200 µm in width and 200 µm in length were partitioned by arranging the two glass substrates, on which a layered electrode and an insulating layer were formed, with the insulating layers being faced each other, and by providing PET boards of 50 µm in thickness at prescribed intervals. The positively charged white particles [W] and the negatively charged black particles [B] were made to fill the each partitioned cell to each occupied volume of white particles and black particles of 15%, to produce the pattern image forming member [1].

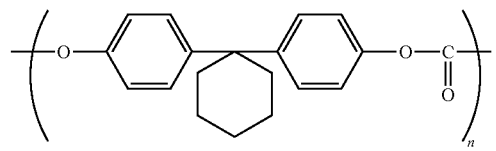

Structure Formula (1)

(wherein n represents an integer of not less than 1.)

Example 1

For Manufacturing of Structural color Display

The image display sheet [1], which was used as a display layer, was adhered to the surface of the pattern image forming member [1] by means of a transparent adhesive comprising a UV curable epoxy resin, to manufacture the structural color display shown in FIG. 1. The above-described structural color display is referred to as display [1].

Examples 2 to 5

For Manufacturing of Structural Color Display

Each of the displays [2] to [5] was manufactured in a similar manner to Example 1 for manufacturing of structural color display except that the image display sheet [1] was changed to each of the image display sheets [2] to [5].

Comparative Example 1

For Manufacturing of Structural Color Display

A device composed only of the electronic paper employed in Example 1 for manufacturing of the structural color display was manufactured, which was then referred to as display [x] for a comparative example.

Comparative Example 2

For Manufacturing of Structural Color Display

The display [y] for a comparative example was manufactured in a similar manner to Example 1 for manufacturing of a structural color display except that an "R" (red) color filter of "HIGH-COLOR-PURITY COLOR FILTER" (made by Dai Nippon Printing Co., Ltd.) was employed in place of the image display sheet [1].

Examples 1 to 5, and Comparative Examples 1 to 2

With regard to the displays [1] to [5] of the present invention and the displays [x] and [y] for the comparative example, the display color was visually observed from a front direction perpendicular to the display (that is, an viewing angle θ to a perpendicular of the image display sheet was zero) when the pattern image forming member [1] was made to behave a switching between black and white, and at the same time, it was evaluated whether the display color, which was visually observed from an oblique direction (that is, an viewing angle θ to a perpendicular of the image display sheet was 45 degrees), was changed from the color which was visually observed from a front direction. In addition, the brightness of the image surface of the display was evaluated as described below The results were shown in Table 1.

—Evaluation of Brightness on Image Surface—

Evaluation was performed by means of visual observation by 50 evaluators on an image surface of the display in operation from the same distance and under the same lighting conditions, and judgment was made based on the numbers of the evaluators who recognized that the image surface was sufficiently bright and easily viewable.
A: Not less than 45 evaluators
B: From 35 to 44 evaluators
C: Not more than 34 evaluators

TABLE 1

| Display No. | Particle for color showing layer | | | Color observed from front direction | | Change of color observed from oblique direction | Evaluation of brightness |
|---|---|---|---|---|---|---|---|
| | Particle material | Average particle diameter (nm) | CV value (%) | Display color of electronic paper | | | |
| | | | | Black | White | | |
| Example 1 | 1 | PS | 200 | 5 | Green | Magenta | Changed | A |
| Example 2 | 2 | PS | 225 | 5 | Red | Cyan | Changed | A |
| Example 3 | 3 | PS | 250 | 5 | Red | Cyan | Changed | B |
| Example 4 | 4 | PMMA | 215 | 5 | Blue | Yellow | Changed | A |
| Example 5 | 5 | PMMA | 250 | 5 | Red | Cyan | Changed | B |
| Comparative example 1 | X | — | — | — | Black | White | Not changed | C |
| Comparative example 2 | y | — | — | — | Black | Red | Not changed | C |

As clearly shown from the Table 1, it was confirmed on the displays [1] to [5] of the embodiments of the present invention that the visually observed colors viewed from a front direction perpendicular to the display were distinctly different from the visually observed colors viewed from an oblique direction of 45 degrees with respect to a perpendicular to the image display. In contrast with the displays [1] to [5], on the displays [x] and [y] of the comparative example, the same colors were observed when viewed from the above-described either directions.

What is claimed is:

1. A structural color display for displaying an image with a structural color, comprising:
    (a) a pattern forming member which has a plurality of cells each lined up in two dimension; and
    (b) a light transmissive image display sheet comprising a color showing layer which shows a structural color, the light transmissive image display sheet being laminated on the pattern forming member, wherein each cell is independently controlled to switch to a light reflective state or to a light absorptive state corresponding to an image pattern to be displayed, wherein that the light absorptive state is a state of the cell in which a light which enters in the cell through the image display sheet is absorbed; and the light reflective state is a state of the cell in which a light which enters in the cell through the image display sheet is reflected and the reflected light is made to enter in a region of the image display sheet corresponding to the cell.

2. The structural color display of claim 1, wherein the color showing layer of the image display sheet comprises a plurality of particles for color showing and a matrix between the particles; and a difference in refractive index between the particles and the matrix is from 0.1 to 0.7.

3. The structural color display of claim 2, wherein each of the particles is spherical and has an average value of an SF-1 value between 100 to 110, the SF-1 value being defined by the following Numerical Formula (1):

SF-1 value=(the maximum length of a particle)$^2$/(a projected area of a particle)×(π/4)×100.    Numerical Formula (1)

4. The structural color display of claim 2, wherein an average particle diameter of the particles is from 100 to 300 nm.

5. The structural color display of claim 2, wherein the particle have a CV value defined by the following Formula (CV) in the range of 20% or less:

CV value (%)=((a standard deviation)/(an average particle diameter))×100.    Formula (CV)

6. The structural color display of claim 2, wherein the particles in the color showing layer are close-packed so as to form a cubic close-packed structure or a hexagonal close-packed structure.

7. The structural color display of claim 1, wherein the color showing layer has a thickness of 3 to 30 μm.

8. The structural color display of claim 1, comprising a plurality of color showing layers having a repeating number of 8 to 50.

9. The structural color display of claim 1, wherein the light absorptive state has a reflectance of 1 to 20%; and the light reflective state has a reflectance of 80 to 100%.

10. The structural color display of claim 1, wherein each of the cells has dimensions of width×length× height from 20×20×20 μm to 2,000×2,000×200 μm.

11. The structural color display of claim 1, wherein each of the cells contains a plurality of black particles and a plurality of white particles; and the plurality of black particles and the plurality of white particles are electrified in reversed polarity to each other.

12. The structural color display of claim 1, wherein the plurality of black particles and the plurality of white particles each has a volume-based median diameter $D_{50}$ of 2.5 to 20 μm.

13. The structural color display of claim 1, wherein the ceiling wall of the cell contacting with the image display sheet is transparent.

* * * * *